United States Patent [19]
Black et al.

[11] Patent Number: 5,184,115
[45] Date of Patent: Feb. 2, 1993

[54] TOUCH-SCREEN ARRANGEMENT

[75] Inventors: Edward P. Black, Salt Lake City, Utah; Douglas C. Smith, Rumson, N.J.

[73] Assignee: AT&T Bell Laboratories, Murray Hill, N.J.

[21] Appl. No.: 532,721

[22] Filed: Jun. 4, 1990

[51] Int. Cl.$^5$ .............................................. G09G 3/02
[52] U.S. Cl. .................................. 340/708; 340/706; 340/712; 178/18
[58] Field of Search ............... 340/712, 708, 707, 706; 178/18, 19; 324/121 R, 226, 239

[56] References Cited

U.S. PATENT DOCUMENTS

| | | | |
|---|---|---|---|
| 4,418,242 | 11/1983 | Kouno | 178/19 |
| 4,471,162 | 9/1984 | Aono et al. | 178/19 |
| 4,577,058 | 3/1986 | Collins | 178/18 |
| 4,771,276 | 9/1988 | Parks | 340/712 |

Primary Examiner—Jeffery A. Brier
Assistant Examiner—Jick Chin
Attorney, Agent, or Firm—David R. Padnes

[57] ABSTRACT

In an arrangement wherein an inquiry and a choice of respones thereto are displayed on a CRT screen, a selection is made by holding a touch-screen device against the area of the screen corresponding to the desired response. Such a touch-screen device is designed to have an inductive coil in its tip. When an electron beam which scans the CRT screen sweeps across the tip of the touch-screen device, an electrical signal is induced on the coil. The touch-position or the selection is determined based on a knowledge of the position of the electron beam on the screen at the time of the electrical signal induction.

30 Claims, 2 Drawing Sheets

TOUCH-SCREEN ARRANGEMENT

TECHNICAL FIELD

This invention relates to an arrangement in which a position-determination device is used to locate a surface contact on a cathode ray tube (CRT) screen.

BACKGROUND OF THE INVENTION

There are many applications where a response to information displayed on a CRT screen is desired. For example, a video game, which is played on a personal computer or a television set, is oftentimes programmed to display a menu of choices from which a user may make a selection. The user is typically instructed to operate specific keys on a keyboard or a similar device to accomplish this selection. Multiple menus are also often used where, in response to the user operating a selected key to make a selection, the menu changes and the user may make another selection, again making a selection by operating specific keys. The process of menu display and selection can be repeated many times. Such an arrangement is time consuming and tedious since a user must first look at the screen, determine a choice, and then examine a separate device to find the proper key to effectuate this choice.

Several attempts have been made to solve the above-identified problem, one such attempt being the use of a touch-sensitive screen. With such a screen, a particular choice can be selected from a menu by a user touching the area of the screen where that choice is displayed. Various techniques have been employed in the prior art to provide the touch-sensitive-screen capability. The use of perpendicularly disposed light beams is one such example. In this technique, infrared light beams are emitted from each of two perpendicular sides of a screen and are received by sensors. As such, the light beams travel across the screen horizontally and vertically. Each of the light beams is received by one of the sensors. When a finger touches a particular spot on the screen, a horizontal beam and a vertical beam are thus momentarily prevented from being received by their corresponding sensors. The touch-position is determined based on a knowledge of which two sensors are deprived of their otherwise receivable beams. This use of perpendicular light beams, while widely used, requires many special, physical and electrical arrangements to provide the touch-sensitive-screen capability and it is expensive to implement.

Many other touch-sensitive-screen techniques make use of special surfaces for the screen. One such technique requires that a screen be covered with two parallel resistive membranes. This particular technique relies on the fact that when a person touches the screen, the two membranes contact each other, and this causes the electrical resistance of the membranes to change. A circuit behind the screen determines the touch-position based on the variation in the resistance. However, the added membrane surfaces, required by this technique and its variants, not only incur additional costs but also undesirably degrade the resolution of the display. More importantly, all of the aforementioned prior art techniques, in one way or another, either call for specially designed monitors or require modifications to standard monitors or television sets.

There is, however, a touch-screen technique which can be applied to any monitor having a CRT, such as a television set. As is well known, images are created on a CRT screen as it is scanned by an electron-beam. This electron beam is generated inside the CRT and the scan is orchestrated by control circuitry inside the monitor. In accordance with such a touch-screen technique, a light pen is held against the image on the CRT screen corresponding to a desired selection. Light from that image then enters the pen wherein a photo-diode generates a signal output. The touch-position is determined based on the knowledge of the position of the electron-beam with respect to the screen at the time of the signal output. The use of a light pen also has shortcomings. One shortcoming is that light pens are susceptible to interference caused by ambient light. Another is that the light pen's photo-diode may not be durable enough for certain applications.

Accordingly, it is desirable to have a touch-screen device which can be used with any monitor having a CRT screen and which, unlike a light pen, is durable and unsusceptible to interference due to ambient conditions.

SUMMARY OF THE INVENTION

The present invention overcomes the prior art limitations by the inclusion of a magnetic-field sensor in a touch-screen device. In accordance with the present invention, the touch-screen device is held against any selected spot on a CRT screen which is scanned by an electron beam. The magnetic-field sensor in the touch-screen device responds to the magnetic field inherently associated with the scanning electron beam. This response is triggered as the beam scans across the selected spot. The touch-position on the screen is determined based on a knowledge of the time instant at which the magnetic-field sensor is triggered.

Advantageously, the present invention supports any television set or computer monitor having a CRT screen. Moreover, the touch screen device can incorporate an inexpensive and durable inductive coil as the magnetic field sensor.

DETAILED DESCRIPTION

Figure 1:
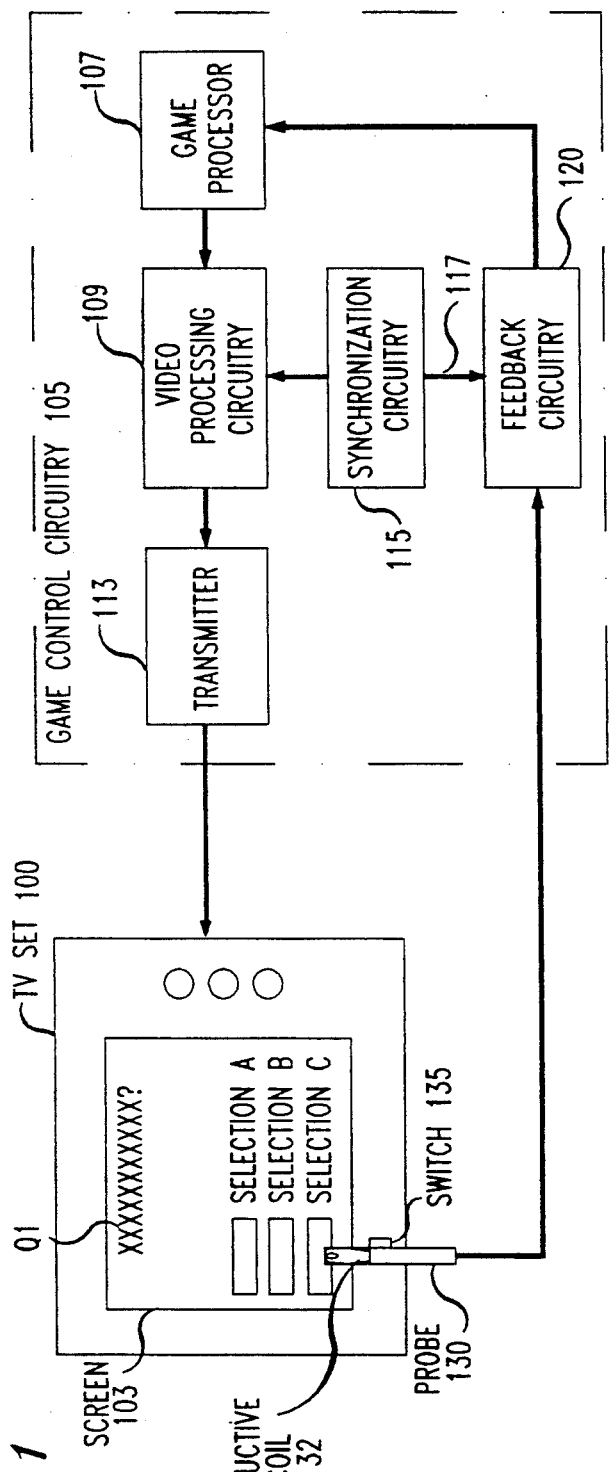
FIG. 1 is a block diagram of a touch-screen arrangement embodying the principles of the present invention.

FIG. 1 illustrates an arrangement in which an interactive video game is played on television (TV) set 100. The latter is of conventional design and it includes a standard CRT having screen 103. A cathode ray source inside the CRT emits an electron beam which strikes the screen and produces a dot of light at the point of impact. A control circuit (not shown) in TV set 100 continuously deflects the electron beam so as to move the dot around screen 103 rapidly to generate a composite picture. The electron beam scans screen 103 in an orderly, synchronized manner, starting at the top thereof and going horizontally from left to right and slowly downward. The horizontal scan rate is 15.750 KHz for black and white TV and 15.735 KHz for color one. (Since TV set 100 is a color TV in this instance, the horizontal scan rate is, thus, 15.735 KHz.)

As is well known, in order to minimize flicker and blur associated with fast screen motions, a picture frame is interlaced with so-called "even field" and "odd field", and each vertical scan covers either one of the two fields. As such, screen 103 is vertically scanned twice for each picture frame. The field rate is 60 Hz, and the frame rate is, accordingly, 30 Hz.

Game control circuitry 105 is typically found in a prior art TV game machine. It includes game processor 107, video processing circuitry 109, transmitter 113, synchronization circuitry 115 and feedback circuitry 120. Specifically, game processor 107 receives in a standard way, software instructions which are provided thereto by an external game cartridge (not shown). Depending on the instructions from a particular game cartridge and responses from feedback circuitry 120, game processor 107 accordingly orchestrates the display of TV set 100 to effectuate the game. In this illustrative embodiment, a fictitious trivia pursuit game is played on TV set 100. In this game, various questions are posed to a player in a sequential manner and a choice of responses to each question is provided via the display on screen 103. In addition, a score, which reflects the cumulative number of correct answers selected by the player, can be displayed and continuously updated by game processor 107.

Video processing circuitry 109 receives the data to be displayed on screen 103 from game processor 107. In a conventional manner, circuitry 109 converts this data into the corresponding video patterns realizable on screen 103. To this end, circuitry 109 generates data signals representing dot-matrix patterns of the characters and graphics to be displayed. It thereupon interleaves the data signals with other standard signals including horizontal and vertical sync signals, thereby providing a series of properly formatted pictures to TV set 100. Each horizontal sync signal is used by TV set 100 to synchronize the start of an horizontal scan. Likewise, each vertical sync signal is used to reset a vertical scan. The vertical sync signals repeat at 60 Hz which corresponds to the field rate as mentioned before.

Synchronization circuitry 115 is conventionally phased locked to the internally generated horizontal sync signals and vertical sync signals. These sync signals are provided to video processing circuitry 109 for the synchronization purposes as described before. In addition, circuitry 115 also supplies, via lead 117, the vertical sync signals of 60 Hz to feedback circuitry 120.

Transmitter 113 amplitude-modulates a radio-frequency carrier with the sequence of signals received from video processing circuitry 109. The carrier frequency typically assumes one of the standard TV channel frequencies. In this particular embodiment this carrier frequency is 55.250 MHz which corresponds to commercial Channel 2. Transmitter 113 is directly wired to the antenna terminals (not shown) of TV set 100 which is tuned to receive the commercial Channel 2 broadcast. This being so, TV set 100 processes the amplitude-modulated signal from transmitter 113 as if it were from the broadcast.

TV set 100 displays on screen 103 based on the signals received by the antenna terminals. FIG. 1 shows the screen at a particular instant, where, as part of the trivia pursuit game, a question Q1 and three boxes, which are indicated as selection A, selection B and selection C, are displayed. This ensemble of selections serves as a choice of answers to Q1. In response to Q1, the player contacts the inside of the box corresponding to the desired selection with the tip of probe 130 and activates the probe by pressing switch 135 thereon. (In this instance, as illustrated, the player has picked selection C as the desired answer.) Probe 130 accordingly generates a signal which is processed by feedback circuitry 120. The processed signal indicates to game processor 107 that the player picked selection C. Game processor 107 then checks the answer, updates the current score and changes the screen display in accordance with the software instructions.

Figure 2:
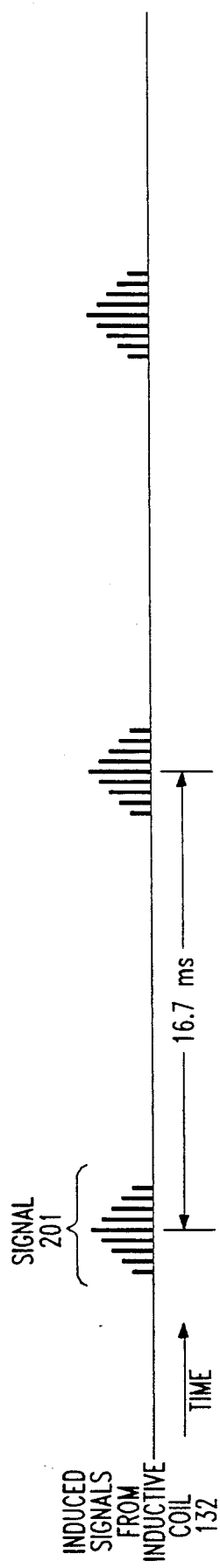
FIG. 2 illustrates the signals induced within a touch-screen device employed in the arrangement of FIG. 1.

As mentioned before, images on screen 103 are created by an electron beam scanning the screen. As the electron beam sweeps across screen 103, an electric current is realized on the same. As is well-known, an electric current carries around it an inherent magnetic field. This being so, the electron-beam scan is accompanied by a magnetic field throughout screen 103. In particular, as the electron beam sweeps across the area touched by probe 130, the latter is momentarily surrounded by a magnetic field. Because probe 130 is designed to have inductive coil 132 in its tip in accordance with the present invention, an electrical signal is induced on coil 132 during the presence of the transient magnetic field. This induced signal is depicted as signal 201 in FIG. 2. A closer look reveals that signal 201 consists of a group of spikes. In fact, each spike is induced when a horizontal scan sweeps across inductive coil 132. Particularly, the center spikes having higher amplitudes are associated with the horizontal scans that pass the center of inductive coil 132. As such, the spikes repeat at 15.735 KHz corresponding to the horizontal scan rate; and the duration of signal 201 varies directly with the amount of screen area that coil 132 covers. Moreover, electrical signals similar to signal 201 are further induced on coil 132 at 60 Hz (or a period of 16.7 ms) for the time interval during which probe 130 is held against screen 103. This stems from the fact that the electron beam revisits the touch-area at the field rate of 60 Hz.

Figure 3:
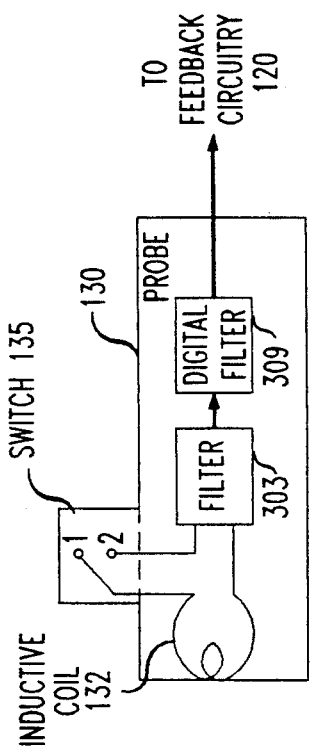
FIG. 3 is a block diagram of the touch-screen device.

Refer now to FIG. 1 and FIG. 3. The latter illustrates probe 130 in detail. The aforementioned electrical signals induced on coil 132 are relayed via switch 135 to filter 303 and digital filter 309 in probe 130. The circuit in probe 130 is initially open when switch 135 is in its position 1 so as to prevent any false triggering of probe 130 during the selection process. As in this instance, had the probe's circuit not been initially open, the player when making selection C might have accidentally held probe 130 too close to boxes other than the desired box, thus falsely triggering probe 130 and making unintended selections. This being so, it is preferable for the player to hold probe 130 against the desired box before the probe is activated by toggling to its position 2.

Filter 303 is a low-pass filter and has a bandwidth of 200 KHz in this particular illustrative embodiment. The functionalities of filter 303 include (a) mitigating noises in the induced signals possibly caused by the electromagnetic interference and electrostatic discharge arising from the contact of screen 103 with probe 130, and (b) amplifying the induced signals to facilitate subsequent signal processing.

The resulting signals from filter 303, like the induced signals input to the filter, are separated in time from each other by 16.7 ms. Each filtered signal takes the form of a group of 15.735 KHz analog pulses having same relative amplitudes as the spikes of the corresponding input signal. As such, similar to the center spikes, the amplitudes of the center pulses are higher than the rest of the pulses in each group. The validity of these filtered signals is verified by digital filter 309 of conventional design. This digital filter selectively responds to the center pulses of a valid signal from filter 303. To this end, digital filter 309 is only triggered by the center pulses whose amplitudes exceed a predetermined threshold. Once triggered, digital filter 309 checks the frequency of the center pulses. Upon recognizing their signature frequency of 15.735 KHz, digital filter 309 issues a pass signal. This being so, digital filter 309 generates a train of pass signals as it validates its sequence of inputs. Moreover, the pass signals, thus issued, repeat at 60 Hz (or, again, a period of 16.7 ms). Feedback circuitry 120 receives the pass signals from digital filter 309 at one input. At another input, feedback circuitry 120 receives, via lead 117, the aforementioned 60 Hz vertical sync signals from timing circuitry 115.

Figure 4:
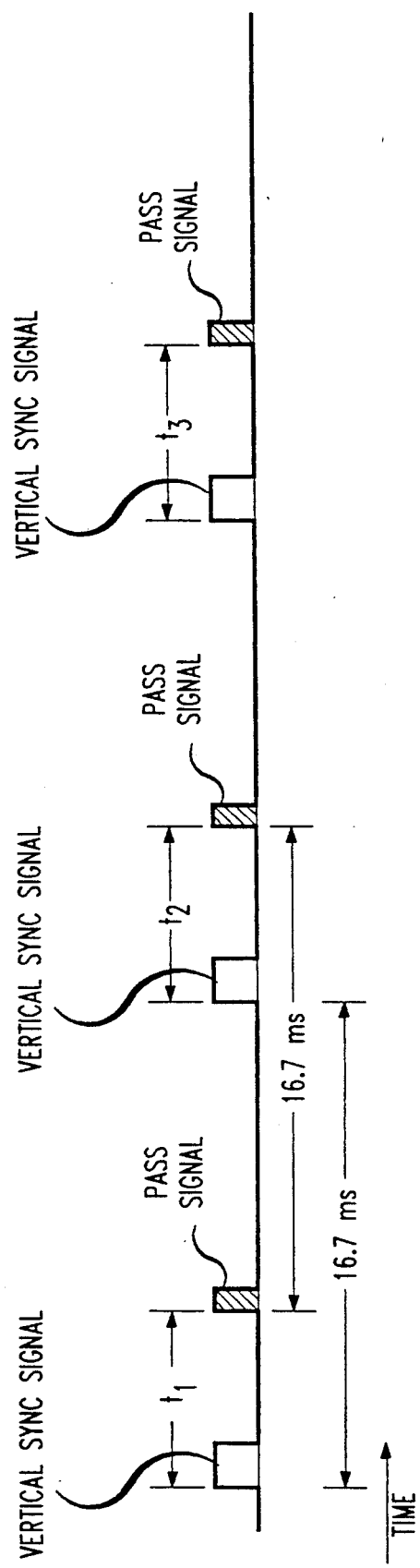
FIG. 4 illustrates a timing diagram for determining a touch-position on a screen in the arrangement of FIG. 1.

FIG. 4 illustrates the pass signals from digital filter 309 as shaded pulses while the vertical sync signals from timing circuitry 115 as unshaded ones. Feedback circuitry 120 determines the length of time by which a vertical sync signal leads the corresponding pass signal. It also records a predetermined number of samples of the leading time such as $t_1$, $t_2$ and $t_3$. It thereupon determines a final leading time, t, based on the majority of the leading-time samples.

It should be pointed out at this juncture that each vertical sync signal marks the start of a vertical scan of the electron beam at the top of screen 103; and each pass signal marks, in this instance, the time that the electron beam sweeps across the box corresponding to Selection C touched by probe 130. This being so, the touch-position with respect to the top of screen 103 is determinative. In fact, the relative vertical distance of this touch-position from the top of screen 103 can be expressed as a fraction of the total vertical distance across the screen. This fraction can be shown to be t (ms)/16.7 ms, where 16.7 ms is the period of the vertical sync signals. (For example, if the touch-position is three-quarters down the screen, t would be 12.5 ms long.) Feedback circuitry 120 communicates a signal representing such fraction, indicative of Selection C, to game processor 107.

The foregoing merely illustrates the principles of the present invention. It will thus be appreciated that those skilled in the art will be able to devise numerous other arrangements which embody the principles of the invention and are thus within its spirit and scope.

For example, although the touch-screen device—probe 130—disclosed herein employs an inductive coil to sense the magnetic field associated with the electron-beam scan, it is apparent that the coil can be replaced by other appropriate magnetic-field sensitive elements. In addition, while the touch-screen device has been disclosed in reference to a video game arrangement, such device may also be desirable for other applications. For example, using this device, a TV viewer could vote at a TV screen in response to a presidential election when, in fact, interactive TV becomes available in the future. That is, with the interactive TV, the viewer could cast his/her vote by holding the touch-screen device against the name of the desired candidate on the screen. Finally, although the disclosed arrangement is embodied in the form of various discrete electronic building blocks and components, the invention could equally as well be embodied in an arrangement in which the functions of any one or more of those building blocks and components or indeed, all of the functions thereof, are realized, for example, by one or more appropriately programmed processors.

We claim:

1. Apparatus for use with a CRT, said CRT emitting an electron beam which scans a viewing screen, said apparatus comprising
    means including an inductive coil for detecting a magnetic field generated by the scan of said electron beam on said viewing screen, and
    means for activating a generation of a signal indicative of a detection of said magnetic field.

2. The apparatus of claim 1 wherein said CRT is included in a television set.

3. The apparatus of claim 1 wherein said CRT is included in a computer monitor.

4. The apparatus of claim 1 wherein said signal is an electrical signal.

5. Apparatus for use with a display device having a screen which is scanned by an electron beam, said apparatus comprising
    means including an inductive coil for sensing a magnetic field generated by the scan of said electron beam, and
    means responsive to the sensed magnetic field for determining the time instant at which said electron beam scans across a particular point of said screen.

6. The apparatus of claim 5 wherein said screen is associated with a cathode ray tube (CRT).

7. The apparatus of claim 5 wherein said display device is a television set.

8. The apparatus of claim 5 wherein said display device is a computer monitor.

9. A system having a cathode ray tube (CRT) wherein an electron beam scans a screen associated with said CRT, said system comprising
    means for displaying a menu of selections on said screen, and
    means including an inductive coil for detecting a magnetic field generated by the scan of said electron beam on different areas of said screen, each of said different areas corresponding to a particular one of said selections in said menu.

10. The system of claim 9 wherein said CRT is included in a television set.

11. The system of claim 9 wherein said CRT is included in a computer monitor.

12. A system having a CRT screen which is scanned by an electron beam, said system comprising
    means for displaying a menu of choices on said CRT screen,
    means including an inductive coil for detecting a magnetic field generated by the scan of said electron beam on said CRT screen, said detecting means being placed over a particular area of said CRT screen corresponding to a selected one of said choices, and
    means for determining the location of said particular area on said CRT screen to identify said selected choice.

13. The system of claim 12 wherein said CRT screen is included in a television set.

14. The system of claim 12 wherein said CRT screen is included in a computer monitor.

15. A method for use with a display device having a screen which is scanned by an electron beam, said method comprising the steps of sensing a magnetic field generated by the scan of said electron beam, using an inductive coil and determining, in response to the sensed magnetic field, the time instant at which said electron beam scans across a particular point of said screen.

16. The method of claim 15 wherein said screen is associated with a cathode ray tube (CRT)

17. The method of claim 15 wherein said display device is a television set.

18. The method of claim 15 wherein said display device is a computer monitor.

19. A method for use in a system having a cathode ray tube (CRT) wherein an electron beam scans a screen associated with said CRT, said method comprising the steps of displaying a menu of selections of said screen, and detecting a magnetic field generated by the scan of said electron beam on different areas of said screen, using an inductive coil each of said different areas corresponding to a particular one of said selections in said menu.

20. The method of claim 19 wherein said CRT is included in a television set.

21. The method of claim 19 wherein said CRT is included in a computer monitor.

22. A method for use in a system having a CRT screen which is scanned by an electron beam, said method comprising the steps of displaying a menu of choices on said CRT screen, detecting a magnetic field generated by the scan of said electron beam on said CRT screen by means of a sensor, said sensor comprising an inductive coil being placed over a particular area of said CRT screen corresponding to a selected one of said choices, and determining the location of said particular area on said CRT screen to identify said selected choice.

23. The method of claim 22 wherein said CRT screen is included in a television set.

24. The method of claim 22 wherein said CRT screen is included in a computer monitor.

25. A method for use with a CRT having a screen associated therewith, said CRT emitting an electron beam which scans said screen, said means comprising the steps of detecting a magnetic field generated by the scan of said electron beam on said screen, using an inductive coil and generating a signal indicative of a detection of said magnetic field.

26. The method of claim 25 wherein said CRT is included in a television set.

27. The method of claim 25 wherein said CRT is included in a computer monitor.

28. The method of claim 25 wherein said signal is an electrical signal induced in the presence of said magnetic field.

29. Apparatus for use with a CRT, said CRT emitting an electron beam which scans a viewing screen, said apparatus comprising means including an inductive coil responsive to the magnetic field generated by the scan of the electronic beam for generating an induced electrical signal, means responsive to said induced electrical signal, whose amplitude exceeds a predetermined amplitude level, for generating a pass signal, and means responsive to a receipt of synchronization signals marking the start of each scan of said electron beam and a receipt of said pass signal for determining the length of time by which the last received synchronization signal respective of said pass signal leads said pass signal, said determining means generating a signal indicative of the value of said length of time.

30. The apparatus of claim 29 wherein said induced electrical signal comprises spikes, and said generating means is responsive to the highest spike of each signal whose amplitude exceeds a predetermined threshold.

* * * * *